United States Patent

Urbish et al.

[11] Patent Number: 5,734,343
[45] Date of Patent: Mar. 31, 1998

[54] ONE-WAY OPTICAL HIGHWAY COMMUNICATION SYSTEM

[75] Inventors: Glenn F. Urbish, Coral Springs; Robert W. Pennisi, Boca Raton; Dale W. Dorinski, Coral Springs; William Boone Mullen, III, Boca Raton, all of Fla.

[73] Assignee: Motorola, Inc., Schaumburg, Ill.

[21] Appl. No.: 683,334

[22] Filed: Jul. 18, 1996

[51] Int. Cl.⁶ .................................................. G08G 1/04
[52] U.S. Cl. .................... 340/942; 340/937; 340/928; 340/556
[58] Field of Search ................................. 340/905, 928, 340/932.2, 942, 555, 556; 356/51; 359/152; 235/38 H

[56] References Cited

U.S. PATENT DOCUMENTS

| | | | |
|---|---|---|---|
| 3,324,301 | 6/1967 | Goldberg | 340/942 |
| 3,633,158 | 1/1972 | Heibel | 340/34 |
| 4,368,979 | 1/1983 | Ruell | 356/71 |
| 4,970,389 | 11/1990 | Danforth et al. | 250/271 |
| 5,004,908 | 4/1991 | Nakamura | 340/556 |
| 5,541,762 | 7/1996 | Levy | 359/240 |

Primary Examiner—Jeffery Hofsass
Assistant Examiner—Anh La
Attorney, Agent, or Firm—Dale W. Dorinski

[57] ABSTRACT

A one-way optical communication system adapted for vehicular use. A light-readable indicia (35) is embedded in a window or mounted on an exterior portion of a moving motor vehicle (10). The indicia (15) is transparent to visible light and is reflective to infrared or ultraviolet light, making it generally invisible to the unaided human eye. A beam (30) of infrared or ultraviolet light located in a fixed position remote from the moving vehicle illuminates the indicia and portions of the beam are reflected from the illuminated indicia in a representative pattern. The reflected beam is detected by a fixed sensor (25), which provides an electrical signal. The signal is analyzed to determine the identity of the motor vehicle.

12 Claims, 3 Drawing Sheets

ONE-WAY OPTICAL HIGHWAY COMMUNICATION SYSTEM

TECHNICAL FIELD

This invention relates in general to the identification of objects by detecting reflected light of a particular nature, and particularly to the identification of vehicles by light reflected from an embedded insignia.

BACKGROUND

There is a need for an improved highway communication system that would provide a significant step in improving traffic safety, law enforcement, and revenue enhancement for toll roads. Most of these prior art highway communication systems use radio frequency (RF) signals to transmit and/or receive information from a stationary or moving vehicle. One example of such a system is disclosed in U.S. Pat. No. 3,633,158, Hiebel, assigned to the Minnesota Mining and Manufacturing Company. This system provides for transfer of information of a fixed nature from the roadway to the driver concerning speed limits, curves, intersections, or route numbers. It also transmits information of a variable nature from the roadway to the driver, such as upcoming weather, highway construction, accidents ahead, or temporary speed limits. Further, information of a fixed nature may be transferred from the vehicle to the roadway, and information of a variable nature may be transferred from the vehicle to the roadway, such as the identification of the driver or distress calls from the vehicle. However, this system suffers from a number of disadvantages, most of which are due to the fact that RF signals are being used. Due to the very nature of RF signals, these systems are costly to install, operate and maintain, they require separate transmitters for communicating from the roadside to the vehicle, and back from the vehicle to the roadside. Thus, a radio transmitter and receiver is required in each vehicle along with associated wiring, shielding, power supplies, and so forth, and a radio transmitter and receiver is likewise required at all the fixed locations. RF signals are also not restricted to a limited area. Thus, they are subject to interference from other electrical devices and, they themselves may cause signal interference to other electrical devices. Finally, they can be easily tampered with and/or disabled by the driver, and thus are not secure, thereby leading to misuse by a vehicle driver who would seek to avoid identification. The addition of yet another radio signal to an environment already highly congested with RF signals and associated noise, is not a desirable situation.

Other communication systems use optical signals as opposed to RF signals. The most well know of these is the system where railroad cards are identified by means of a large bar code label attached to the side of the railroad car. As the car passes by a predetermined location, a laser beam reads the bar code label on the side of the car and records the information for later use. Although this method is a significant advance over previous levels of the art, it has the disadvantage of requiring a large, unsightly label to be secured to the side of the railroad car. While this may be acceptable for use in industrial environments, the consumer environments (private motor vehicles), will certainly not condone the use of a large, unsightly label pasted onto the side of every vehicle. Automobiles do have metal tags with a bar-coded vehicle identification number (VIN) typically located on the driver's side of the dashboard for use in inventory control; however, this label is far too small to be utilized on a moving vehicle.

Still other systems utilize an active transponder mounted in the moving vehicle such as the classic identification of friend or foe (IFF) systems commonly used in civilian and military aircraft. The disadvantage of this type of system is the complexity of the system and the associated cost. Any system selected for use in the consumer market must have an extremely low cost and wide applicability, which certainly rules out the IFF transponder/receiver systems.

It would be an improvement over the known art if an unobtrusive, low-cost vehicle identification system could be created that would not use radio frequency signals and that could be implemented for use on a moving vehicle.

DETAILED DESCRIPTION OF THE PREFERRED EMBODIMENT

Figure 1:
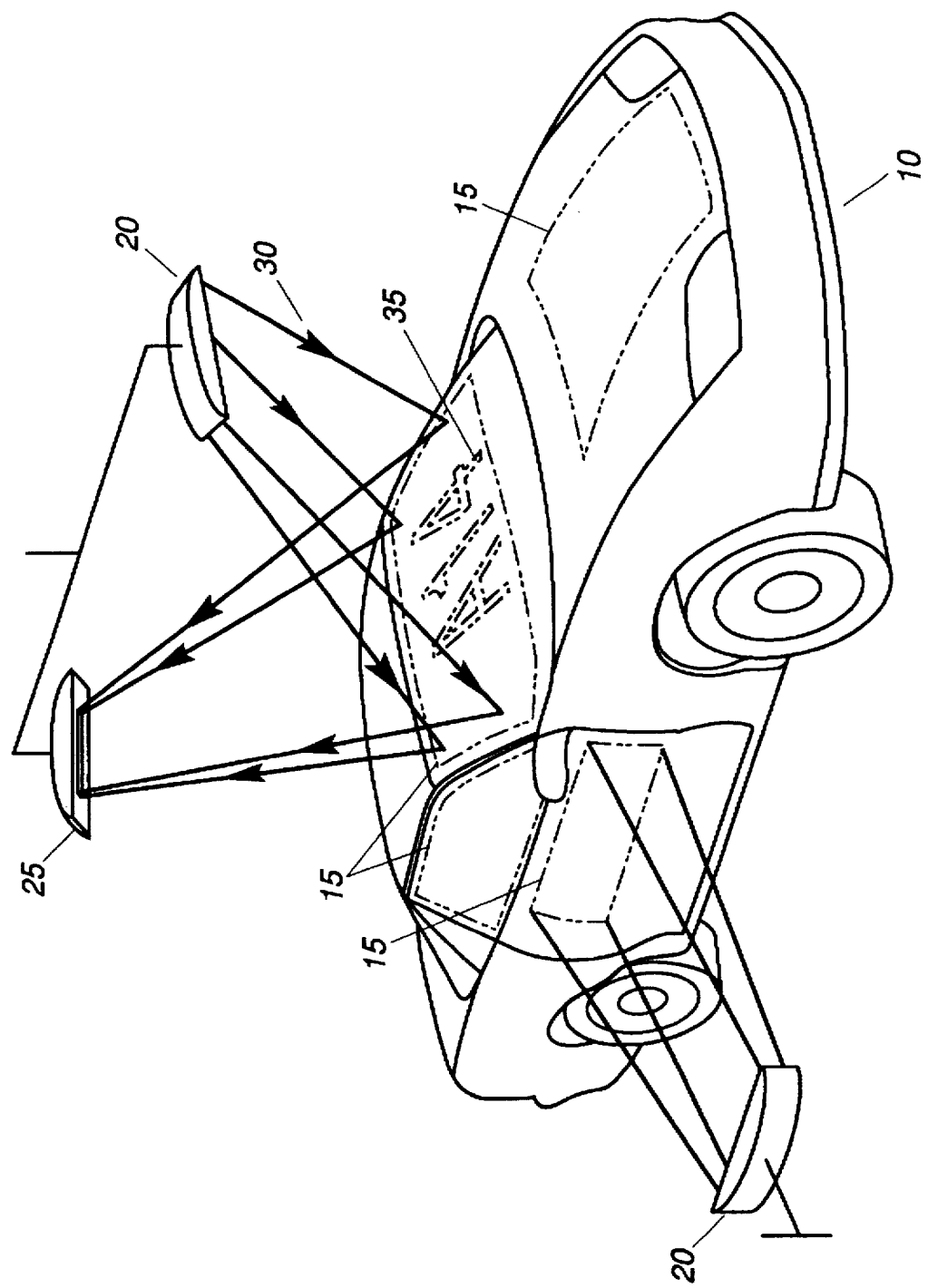
FIG. 1 is an isometric view of the one-way communication system implemented on an automobile in accordance with the invention.

A one-way optical communication system is adapted for vehicular use. A light-readable indicia is embedded in a window or mounted on an exterior portion of a moving motor vehicle. The indicia is transparent to visible light and is reflective to infrared or ultraviolet light, making it generally invisible to the unaided human eye. A beam of infrared or ultraviolet light located in a fixed position remote from the moving vehicle illuminates the indicia, and portions of the beam are reflected from the illuminated indicia in a representative pattern. The reflected beam is detected by a fixed sensor, which provides an electrical signal. The signal is analyzed to determine the identity of the motor vehicle.

While the specification concludes with claims defining the features of the invention that are regarded as novel, it is believed that the invention will be better understood from a consideration of the following description in conjunction with the drawing figures.

Figure 2:
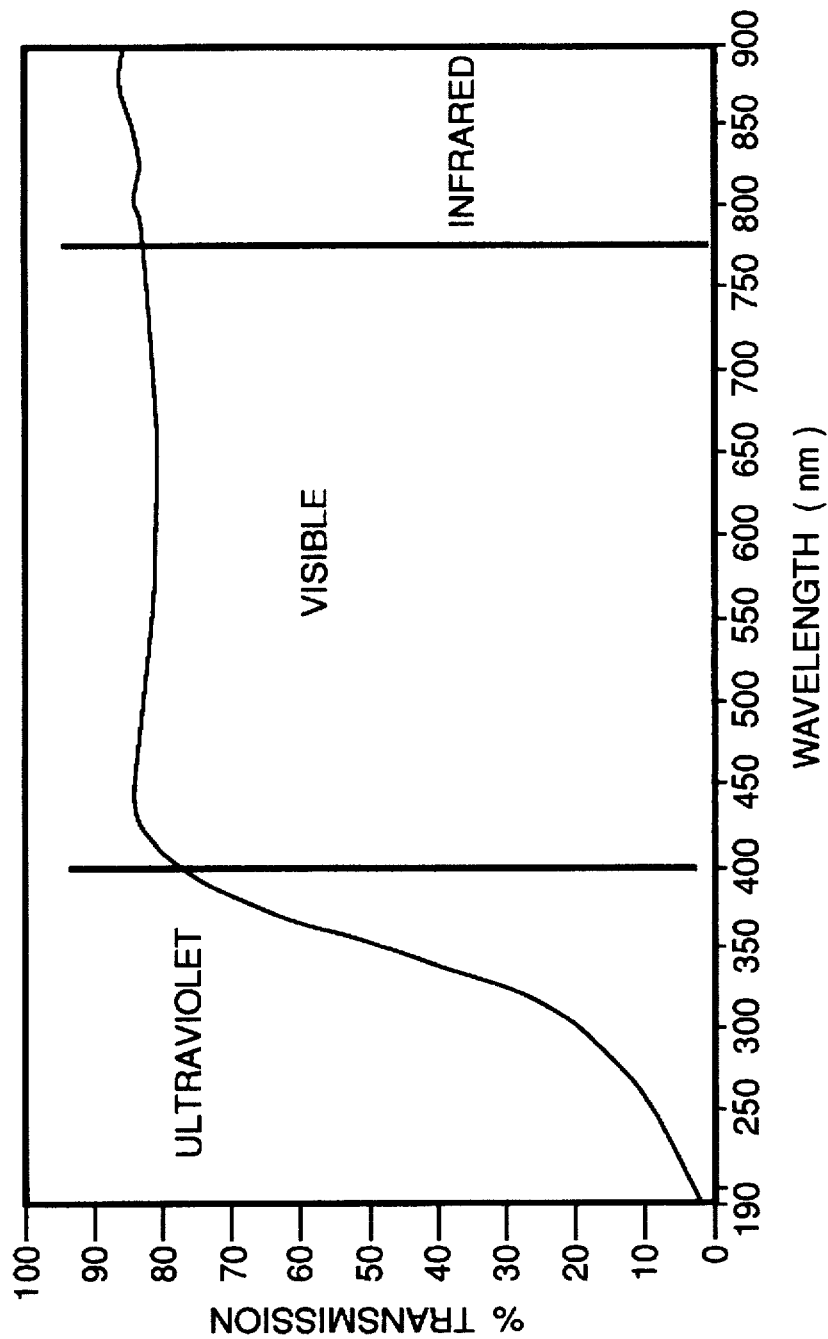
FIG. 2 is graph of percent transmission versus wavelength for an indium-tin oxide film.

Referring now to FIG. 1, a vehicle 10, such as a car, truck, bus, airplane, train, boat, motorscooter, etc., contains a label 15 affixed to an exterior portion of the vehicle. FIG. 1 shows a plurality of labels 15 affixed in a variety of different locations on the vehicle 10 in order to illustrate some of the potential locations for the label. However, in practice, only one or two locations on each vehicle are used, depending upon the exact configuration of the vehicle and the implementation of the labeling system. Some potential locations for the label are preferably on the windows or the sunroof of the vehicle. However, other locations, such as the hood, the trunk, the vertical sides, and the flat roof, may also be used appropriately. The label 15 is formed in such a manner that it is essentially invisible to the unaided human eye. However, it is reflective to light waves outside of the visible region, such as infrared or ultraviolet. This unique combination of properties may be obtained by using a variety of materials, such as thin films of metal or metal oxides. For example, the well-known indium-tin oxide metal system used in liquid crystal displays is essentially transparent to light in the visible portion of the spectrum. However, it is much less transparent to light in other regions of the spectrum, such as infrared or ultraviolet, and thus acts as a reflector to energy of that frequency. FIG. 2 shows a plot of transmission versus wavelength of an indium-tin oxide thin film. While the film is essentially transparent in the visible region from 400 to 750 nanometers (greater than 85% transmission), the transmission falls off rapidly to nearly zero in the shorter wavelength regions (ultraviolet) below 450 nanometers. Others (Bellingham, Phillips and Adkins, "Amorphous Indium Oxide", *Thin Solid Films*, 195 (1991) 23-31) have reported on the transmittance of indium-tin oxide films at longer (infrared) wavelengths. At the far infrared, the transmittance is between zero and ten percent. Thus, while thin films of indium-tin oxide in particular are transparent to visible light, they are reflectors of light energy outside the visible region. In the preferred embodiment the label 15 is embedded in the vehicle window, typically the front, rear or side windows. A film of indium-tin oxide, or other metals such as aluminum, aluminum oxide, chrome, titanium, titanium nitride, nickel, nickel-chrome alloys, iron, or gold, may also be used. By imbedding the thin film within the laminated structure of the window safety glass, the identification means is protected from the environment and physical harm, and also it is rendered tamper-proof. Thus, once the label is formed in the window, it can only be altered by removing the window. Further, it is preferred that the label be embedded in a fixed window rather than a window that can be raised or lowered, such as the side windows of a vehicle. This prevents the vehicle operator from intentionally defeating the system by lowering the window to hide the label. Since the label 15 is formed of the very thin film, it is essentially invisible to the human observer, for example, the driver or passenger, and does not interfere in any way with the vision of the occupants of the vehicle. Further, since it is not visible to the unaided human eye, the label may also be mounted on non-glass portions of the vehicle exterior, for example, the hood, the roof, the trunk lid, or the vehicle sides. Since it is not visible to the human eye, it does not detract from the appearance of the vehicle, but essentially provides a large, invisible sign useful for machine reading. The label contains the information of a fixed nature, for example, the vehicle identification number (VIN), in a coded form. Since each vehicle has a unique VIN, the use of this number can be not only traced back to the exact vehicle but also to the current owner of the vehicle, as each vehicle registration also contains the VIN. The label 15 may be provided in any number of ways, such as using bar codes, binary coded decimal (BCD), various icons, or alphanumeric text 35. Bar codes have been found to be the label which is most machine readable, however, icons and alphanumeric text are also quite readable and may be used effectively. These various types may be used singly or in combination in the identification label.

Mounted in a fixed location remote from the moving vehicle, is a source 20 of non-visible light, such as infrared or ultraviolet light. The light source 20 can be any one of a number of means. It can be a source that remains continually on or it can be a pulsed light source that is only operated when a vehicle approaches the station. This conserves energy in remote locations where, for example, the toll booth needs to be battery operated. In the preferred embodiment, the light source is a laser which provides a highly-directed beam of light in the appropriate spectrum. Depending upon the desires of the engineer, the light source may or may not include a visible component to the light beam. For example, it may be desirous to have the detecting station be unnoticed by the driver of the vehicle, in which case, the light beam 30 is entirely outside the visible spectrum. However, in other situations, it may be desirous for the driver of a vehicle to have knowledge that the vehicle has been identified, thus a bright burst of visible light would serve as visual feedback to the driver. Pulsed beams (for example, xenon) and other high-intensity beams such as lasers provide a very high signal-to-noise ratio at a relatively low power, and can be selected to deliver the appropriate spectrum of light by use of filters or other conventional means. The light source 20 illuminates the label 15 as the vehicle is passing under the source, and the motion of the vehicle essentially provides a scanning motion of the light over the label 15. Since the information contained in the label is reflective to the infrared or ultraviolet light used in the source, that light is reflected by the label back to a detector 25 that is used to pick up information about the vehicle. The detector 25 can be mounted in a location different than that of the source 20, or it can be mounted in the same location, for example, as shown on the vertical stanchion in FIG. 1. When the detector and the source are co-located in a single unit, this unit is referred to as an optical transceiver. The reflected light picked up by the detector 25 is then converted into an electrical signal which is representative of the information contained in the label 15. This electrical signal is then fed to an analyzer or other sort of control unit, such as a microprocessor, which converts the electrical signal into information used to identify the vehicle. This identification number may then be stored in computer memory and used for any number of purposes such as assessing tolls on a vehicle as it passes a certain location.

One of the primary uses intended for the one-way optical highway communication system is in toll booth operation. The present system requires drivers to stop at a toll booth and pay in cash, prepaid transportation cards or other types of token, on the tollway. The drawbacks of this type of system are many, as any who have driven in an urban environment can attest. During times of high-traffic density, backups are created at toll booths while driver's reduce speed to make payment. One approach to this problem has been to add large numbers of toll booths to highly-traveled routes. However, there is an upper limit to the number of toll booths that can be added, and experience has shown that while this decreases the problem, it does not totally eliminate it. Further, even though the use of automated toll gates is very popular, there is still a need to provide a human operator at toll booths for those occasions when the automated toll malfunctions or when a driver does not have the appropriate amount for payment of the toll. The instant invention solves both of these problems by eliminating the need for the vehicle to slow or stop and deposit payment. As the driver passes a station consisting of a light source 20 and a light detector 25, the invisible label 15 on the vehicle 10 is illuminated by the light source and information about the vehicle, for example, the VIN, is then reflected back to the detector 25. Vehicles do not need to come to a complete stop, nor do they need to slow down to the limits required in present systems, thus traffic flow can be maintained. Further, since the toll booth is now eliminated, the need for expensive automated machines and manual operators has been significantly reduced. Because the system operates at optical frequencies rather than using radio signals, a large number of these vehicle communication stations may be arranged in close proximity without the need to shield or isolate each and every station from the neighboring stations.

Figure 3:
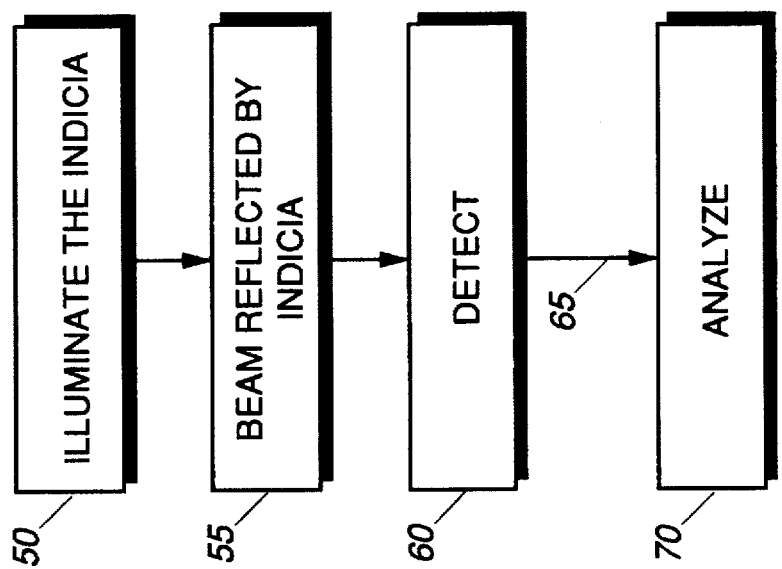
FIG. 3 is a block diagram of a communication system in accordance with the invention.

Referring now to FIG. 3, a block diagram shows the method of one-way vehicle communication. The indicia on a motor vehicle is illuminated in step 50, and portions of the beam are reflected from the illuminated indicia to create a pattern 35 representative of the label 15 (step 55). The reflected beam is detected by the sensor (step 60), and an electrical signal 65 is sent to an analyzer (step 70), where the signal is analyzed to determine the identity of the motor vehicle.

In summary, a novel method of providing one-way optical highway communications has been disclosed. A large label may now be used, essentially the size of a vehicle windshield, that is invisible to the unaided human eye and, thus does not interfere with the vision of the driver or the occupants. Since the label is invisible to the human eye, it does not detract from the appearance of the vehicle and will find wide implementation in consumer markets. Since the communication system does not use radio frequency signals, it does not add to the already congested RF spectrum, and does not prevent shielding and interference problems that are normally associated with RF systems. Further, it is essentially tamper-proof and cannot be altered or obliterated by the vehicle operator, thus avoiding any tampering. It is low cost and easily implementable, and provides significant advantages over the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A one-way optical communication system adapted for vehicular use, comprising:

a motor vehicle having a light-readable indicia comprising a thin film of a metal or metal oxide patterned to be reflective in the infrared or ultraviolet regions of the electromagnetic spectrum, but substantially transparent to visible light, the indicia mounted in a window of the vehicle;

illuminating means, remotely located from the motor vehicle, to illuminate the indicia with infrared or ultraviolet light;

detecting means, remotely located from the motor vehicle, to receive infrared or ultraviolet light reflected from the illuminated indicia;

analyzing means, connected to the detecting means, to process a signal output from the detecting means in order to identify the motor vehicle.

2. The one-way optical communication system as described in claim 1, wherein the light-readable indicia further comprises indium-tin oxide.

3. The one-way optical communication system as described in claim 1, wherein the light-readable indicia is selected from the group consisting of bar codes, binary coded decimals, icons, and alphanumeric text.

4. The one-way optical communication system as described in claim 1, wherein the illuminating means comprises a pulsed beam of light.

5. The one-way optical communication system as described in claim 1, wherein the illuminating means comprises a laser.

6. In a communications system wherein a directional light beam is scanned across an encoded light reflecting element to provide a reflected beam of light representative of the reflecting element, a one-way optical highway communications system comprising in combination:

a source of infrared or ultraviolet light;

an encoded light reflecting element embedded in a motor vehicle window, comprising a thin film of a metal or metal oxide patterned to be visible in the infrared or ultraviolet regions of the electromagnetic spectrum, but substantially transparent to visible light, the encoded light reflecting element generally invisible to an unaided human eye;

a sensor to receive infrared or ultraviolet light reflected from the encoded light reflecting element;

an analyzer connected to the sensor to process a signal from the sensor and identify the motor vehicle.

7. The communication system as described in claim 6, wherein the thin film comprises indium-tin oxide.

8. The communication system as described in claim 6, wherein the encoded light reflecting element is selected from the group consisting of bar codes, binary coded decimals, icons, and alphanumeric text.

9. The communication system as described in claim 6, wherein the encoded light reflecting element contains a vehicle identification number (VIN) for the motor vehicle.

10. The communication system as described in claim 6, wherein the source comprises a pulsed beam of light.

11. The one-way optical communication system as described in claim 6, wherein the source comprises a laser.

12. The communication system as described in claim 6, wherein the motor vehicle is moving and the source of light and the sensor are fixed at a location remote from the moving vehicle.

* * * * *